128,088

UNITED STATES PATENT OFFICE.

KARL WENZEL ZENGER, OF PRAGUE, AUSTRIA.

IMPROVEMENT IN PROCESSES OF PURIFYING IRON AND COPPER.

Specification forming part of Letters Patent No. 128,088, dated June 18, 1872.

*To all to whom it may concern:*

Be it known that I, KARL WENZEL ZENGER, of Prague, Bohemia, in the Empire of Austria, a subject of the Emperor of Austria, have invented or discovered new and useful "Improvements in the Purification of Iron and Copper;" and I, the said KARL WENZEL ZENGER, do hereby declare the nature of the said invention, and in what manner the same is to be performed, to be particularly described and ascertained in and by the following statement thereof—that is to say:

This invention has for its object the removal, by the improved process hereinafter described, of the phosphorus and sulphur from pig-iron by means of the hydrates of alkalies and alkaline earths, separately or together, with the hydrates of the oxides of manganese and iron, and mixed with sawdust or other suitable carbonaceous substance, care being taken that the metals operated upon and intended to be purified are protected during the process of treatment from contact with free oxygen, and that consequent oxidation, which would be injurious, may be avoided.

I conduct the process in the following manner: The melted pig-iron is run either direct from the blast-furnace, or from a cupola or other melting furnace, into an iron vessel lined with coal-dust or graphite mixed with fire-clay, a ton or more of iron being operated on at once. The surface of the melted metal is kept covered to a depth of two inches with a layer of small pieces of charcoal, small-chopped wood, or good coal containing little ash or sulphur. The blast is then directed onto the surface of the molten iron, and care must be taken that it is so regulated that no free oxygen may come into contact with the surface of the metal, which should be covered with a layer of gas consisting of oxide of carbon and nitrogen. Having determined the hydrate which is to be used, the required quantity of the hydrate, together with sawdust, coal-dust, or tar, or other substance containing carbon, or preferably carbon and hydrogen, is put on the surface of the metal, the quantity of the hydrate being so regulated that the iron shall not be deteriorated by alloying with the alkaline metal. I find that a suitable and economical mixture may be made by mixing three parts hydrate of lime with one part of sawdust or tar, forming a crumbling mass. This mixture should be continually stirred on the metal with a rabble to renew the surfaces. The hydrate gradually disappears, being absorbed, and on the surface a reddish slag is formed containing a large proportion of sulphur and part of the phosphorus, the remainder of the sulphur and phosphorus escaping as sulphuretted and phosphoretted hydrogen. The vessel which I employ is cylindrical, and made of wrought-iron, lined with a refractory lining about three inches thick, and is of a size sufficient to work a charge of one ton weight. The interior of the vessel should measure, within the lining, about seventeen inches in depth by twenty-eight inches in diameter. The vessel is provided with a domed cover of cast-iron similarly lined, and the metal cover is provided with ribs to support the lining. The use of this cover is to prevent loss of heat. It does not close tightly onto the cylindrical vessel, but a sufficiently-free escape is permitted between the vessel and the cover all round, and there is a larger opening, to serve as a working-hole, on one side. There is a hole in the center of the cover, through which a vertical nozzle or tuyere descends, so as to introduce the required blast. It is covered externally with a refractory coating, and can be raised or lowered at pleasure. The orifice of the nozzle or tuyere is two and a half inches in diameter, and the pressure of the blast should not exceed one-eighth or one-tenth of an atmosphere. The height of the tuyere from the surface of the metal should be about ten inches, more or less, and the quantity of air should be sufficient to keep the metal thoroughly liquid. The color of the slag should be watched, and, when the process is properly worked, should be of a reddish color. If it becomes dark it is a sign that the blast has not been properly regulated and it is injuriously coming into contact with the metal. When the metal is at a proper heat, and quite fluid, the mixture of hydrate of lime and sawdust or tar is gradually added. The quantity of this mixture to be used depends on the quantity of phosphorus and sulphur known or ascertained by analysis to be contained in the iron. For each per cent. of phosphorus it will be found that, as a rule, about one per cent. of the mixture is required, and for each per cent. of sulphur one-half per cent.; thus, for instance, for a ton of pig-iron (or 2240 pounds) containing two and a half per cent. of phosphorus and one-half per cent. of sulphur, the calculation may be thus made:

$$2240 \times 2.5 \times 0.01 = 56$$
$$2240 \times 1.8 \times 0.005 = 20.16$$
$$\overline{76.16}$$

so that in this case a little more than seventy-six pounds of the mixture are required. The mixture is added in three portions at intervals of ten minutes. Each quantity is well stirred about over the surface of the metal with an iron rabble so as to bring it as much into contact therewith as possible. After stirring for six or seven minutes the metal is allowed to rest for two or three minutes in order that the slag may separate, and the slag is skimmed off and removed by the working-hole before the next portion of the mixture is added. The entire time occupied by my improved process, applied to the quantity of metal above referred to, will be found to be about fifty minutes, and the metal may then be run into a Bessemer converter or into a puddling-furnace, to be made into wrought-iron or steel; or it may be cast into molds. The purified metal will contain scarcely a trace of sulphur, and, even if the iron originally contained two and a half per cent. of phosphorus, the resulting metal will contain not more than one-tenth to one-twentieth per cent. The loss of metal in the above-described process will be found to be from two to five per cent.; but if the hydrates of the oxides of manganese and iron be used in addition to the hydrate of lime with the wood or tar, it will be found that there is a gain of some per cent. of metal.

When the iron is to be treated by the Bessemer process, if the hydrates of the oxides of manganese and iron are used it should be only to a small extent, as otherwise a large proportion of the silicon would be removed and the temperature of the converter in consequence lowered; but if they are not used, or only used in a small proportion, the silicon is not attacked.

The hydrate of lime should not be used in sufficient quantity to alloy the iron with calcium after having removed the sulphur and phosphorus, the calcium rendering the iron white, brittle, and highly crystalline. If the metal is to be submitted to the Bessemer process this precaution is not so important, as in the operation of that process the calcium would be separated.

By the employment of my process even the worst pig-iron may be made suitable for the Bessemer process, a greater proportion of phosphorus being removed than by any known mechanical puddling process. My process may also be used to purify copper from phosphorus, antimony, and arsenic.

The operation is conducted as already described, and, in the calculation of the quantity of the hydrate of lime mixture to be employed, allowance is to be made for antimony and arsenic on the same scale as for phosphorus.

Having thus described the nature of my said invention and the manner of performing the same, I would remark that the method by which the metal is kept hot and protected during the process may be varied; thus, for example, a gas-flame, so regulated as to contain no free oxygen, may be employed in place of air being blown upon carbonaceous matter on the surface of the metal; but it should be remembered that the separation of phosphorus and sulphur can only be properly performed while free oxygen is excluded, and this exclusion is necessary until the metal is no longer in contact with the slag in which the alkaline or earthy phosphide and sulphide are contained.

What I claim is—

The process of purifying iron or copper by means of the hydrate of an alkali, or of an alkaline earth and sawdust, coal-tar, or other carbonaceous matter, brought in contact with and caused to permeate the metal while it is melted and protected from contact with free oxygen and consequent oxidation, in manner substantially as hereinbefore described.

K. W. ZENGER.

Witnesses:
G. F. WARREN,
WILMER M. HARRIS,
*Both of No. 17 Gracechurch street, London.*